(12) United States Patent
Noda

(10) Patent No.: US 11,611,675 B2
(45) Date of Patent: Mar. 21, 2023

(54) IMAGE FORMING APPARATUS AND METHOD OF CONTROLLING IMAGE FORMING APPARATUS

(71) Applicant: SHARP KABUSHIKI KAISHA, Sakai (JP)

(72) Inventor: Shoji Noda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/539,501

(22) Filed: Dec. 1, 2021

(65) Prior Publication Data

US 2022/0182499 A1 Jun. 9, 2022

(30) Foreign Application Priority Data

Dec. 7, 2020 (JP) .............................. JP2020-202604

(51) Int. Cl.
*H04N 1/00* (2006.01)
(52) U.S. Cl.
CPC ....... *H04N 1/0097* (2013.01); *H04N 1/00482* (2013.01); *H04N 2201/0094* (2013.01)
(58) Field of Classification Search
None
See application file for complete search history.

(56) References Cited

U.S. PATENT DOCUMENTS

| 10,432,804 | B2 | 10/2019 | Akuzawa | |
|---|---|---|---|---|
| 2018/0220015 | A1* | 8/2018 | Akuzawa | ........... H04N 1/00506 |
| 2019/0245989 | A1* | 8/2019 | Yoshida | ................ G06F 3/1205 |
| 2020/0204693 | A1* | 6/2020 | Zhang | .................. G06F 3/1205 |

FOREIGN PATENT DOCUMENTS

JP 2018-125686 A 8/2018

\* cited by examiner

*Primary Examiner* — Frantz Bataille
(74) *Attorney, Agent, or Firm* — ScienBiziP, P.C.

(57) ABSTRACT

According to an embodiment, an image forming apparatus which stores settings for use in performing job processing includes: a display; and a storage which stores a setting history related to settings of past job processing, and a collective setting in which settings related to job processing are registered collectively. The image forming apparatus further includes: a setting controller which displays a setting history screen including the setting history on the display, displays on the display, in response to selection of the setting history, a setting screen reflecting setting contents based on the selected setting history, and displays a registration button to perform processing to register the collective setting on the setting screen; and a registration controller which performs the processing to register the collective setting in response to an operation on the registration button.

5 Claims, 14 Drawing Sheets

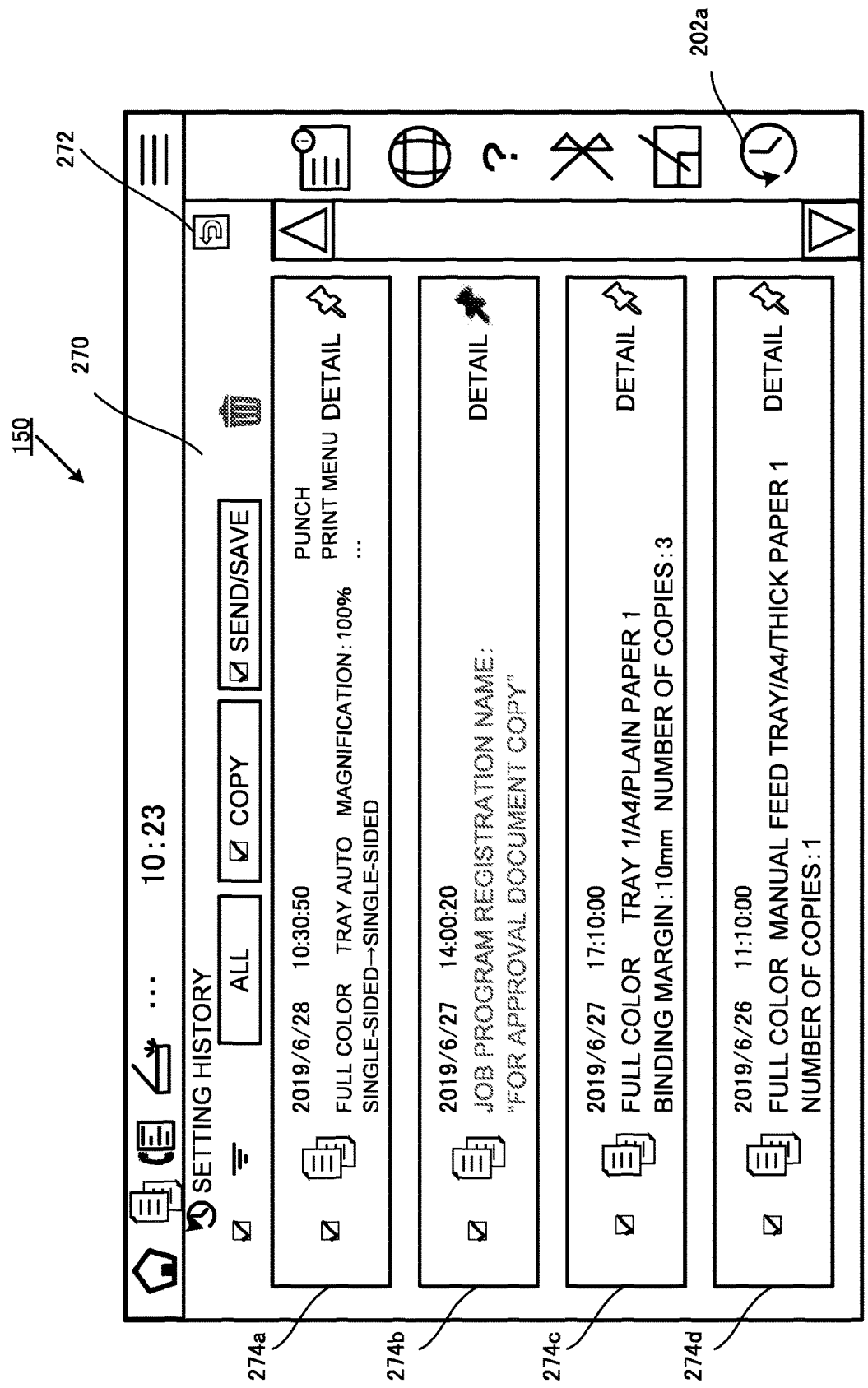

IMAGE FORMING APPARATUS AND METHOD OF CONTROLLING IMAGE FORMING APPARATUS

BACKGROUND OF THE INVENTION

Field of the Invention

The present disclosure relates to, for example, an image forming apparatus which stores settings for use in performing job processing.

Description of the Background Art

Image forming apparatuses, such as multifunction machines, include ones that have job settings registered in advance, and execute a job by calling the settings.

A technology of Japanese Unexamined Patent Application Publication No. 2018-125686 discloses that "setting contents are registered by selection of a setting history of a job, whereby the registration is displayed as a custom button and can be read out easily".

In Japanese Unexamined Patent Application Publication No. 2018-125686, the settings temporarily stored via a setting history of a job are re-registered as a custom button for permanent reference. However, it is possible that the timing at which the registration is enabled will be varied depending on a case where the registration is made from the setting history and a case where the registration is made otherwise. Also, if the same certain operation procedure is conducted in both cases where registration is made from the setting history and where registration is made otherwise, a redundant operation is to be performed by the registration through selection of the setting history. For example, if the user himself/herself is to set the registration name, not only the operation itself is troublesome, but various names are also created according to the user, and it may also become unclear that the registration is made from the setting history. Furthermore, even if the user took the trouble of performing registration processing from the setting history, there are cases where the settings are already registered, and the operation may end up in vain.

In view of such circumstances, the present disclosure aims to provide an image forming apparatus and the like with which an operation procedure is performed easily and efficiently when making registration to a collective setting related to job processing from a setting history of a job.

SUMMARY OF THE INVENTION

The present disclosure is characterized in that in an image forming apparatus which stores settings for use in performing job processing, the image forming apparatus includes: a display; a storage which stores a setting history related to settings of past job processing, and a collective setting in which settings related to job processing are registered collectively; a setting controller which displays a setting history screen including the setting history on the display, displays on the display, in response to selection of the setting history, a setting screen reflecting setting contents based on the selected setting history, and displays a registration button to perform processing to register the collective setting on the setting screen; and a registration controller which performs the processing to register the collective setting in response to an operation on the registration button.

Also, the present disclosure is characterized in that in a method of controlling an image forming apparatus including a display, and a storage which stores a setting history related to settings of past job processing, and a collective setting in which settings related to job processing are registered collectively, the method includes: a setting control step of displaying a setting history screen including the setting history on the display, displaying, in response to selection of the setting history, a setting screen reflecting setting contents based on the selected setting history on the display, and displaying a registration button to perform processing to register the collective setting on the setting screen; and a registration control step of performing the processing to register the collective setting in response to an operation on the registration button.

According to the present disclosure, it is possible to reduce the number of operation steps at the time of registering/reflecting a setting, or easily confirm important information. Therefore, the present disclosure brings about an advantage of preventing the trouble caused by a setting change for a user.

BRIEF DESCRIPTION OF THE DRAWINGS

FIG. 14 is an explanatory diagram illustrating a setting history screen displayed on a display of the image forming apparatus according to the third embodiment.

DESCRIPTION OF THE PREFERRED EMBODIMENTS

Embodiments of the present disclosure will be described below with reference to the accompanying drawings. Note that the following embodiments have been presented by way of example only, and the technical scope of the invention as recited in the appended claims is not limited by the description given below.

1. First Embodiment

An image forming apparatus according to a first embodiment is an apparatus which displays, when a setting history is to be registered in a job program or when setting contents are changed from a default, a program registration button which allows registration to be made in a job program, thereby indicating to a user that program registration with respect to job setting is enabled.

The "job program" pertains to a technology for permanently storing the settings related to a job by hand, and indicates a collective setting in which the settings related to job processing are registered collectively. In a use case where a regular job is executed repeatedly by a job program, as the user calls and executes the job program, the setting can be made collectively. Accordingly, there is an advantage that the number of steps for the setting at the time of executing the job can be reduced.

In addition, the "setting history" pertains to a technology for automatically storing the settings related to a job. When the image forming apparatus performs job processing, information related to the job operation is stored as a job operation history. While the information related to the job operation includes respective pieces of setting information, the job operation history does not assume reusing the setting information. Therefore, the image forming apparatus extracts the setting information from the job operation history, and stores the extracted setting information as the setting history.

1.1 Overall Configuration

Figure 1:
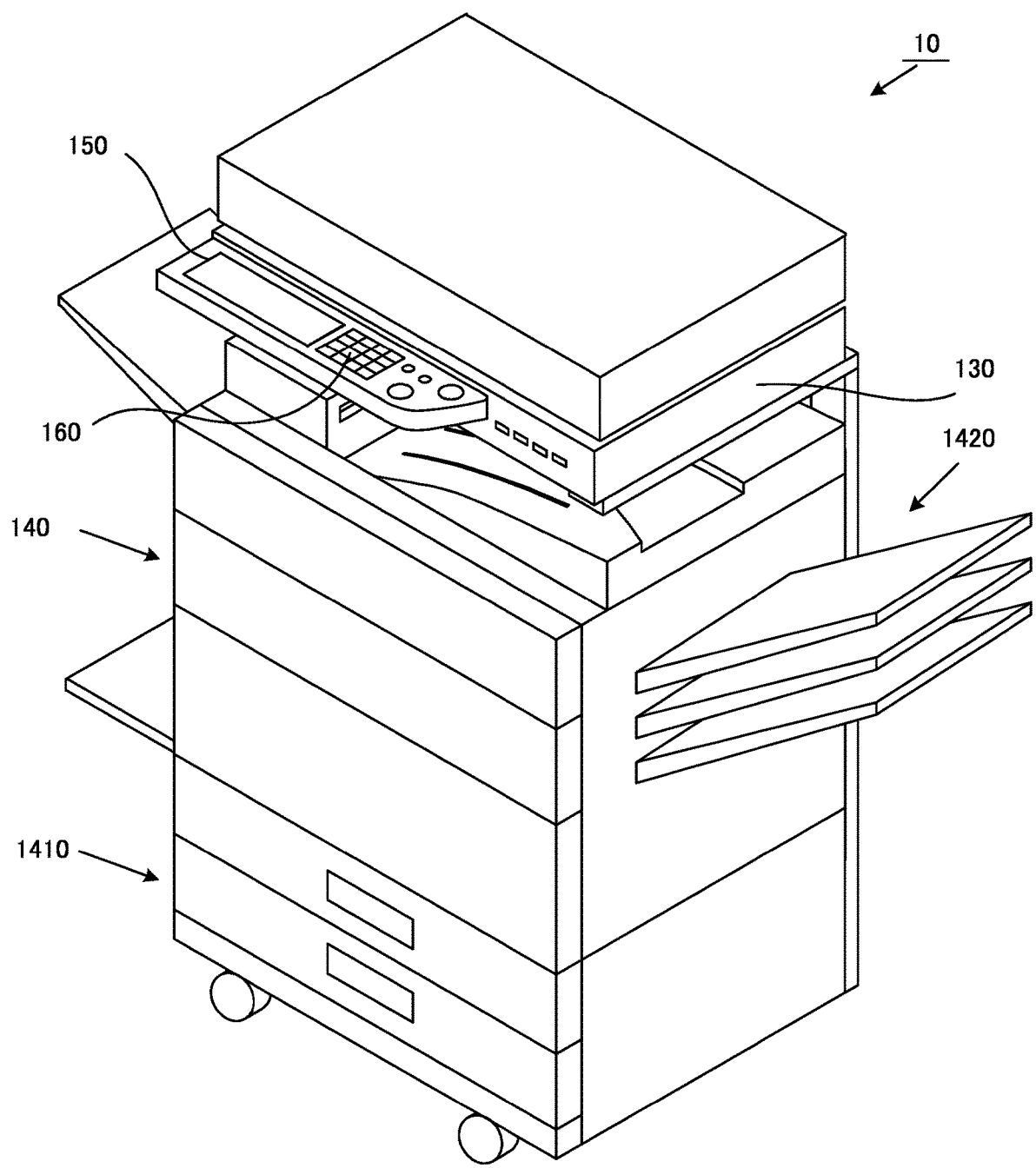
FIG. 1 is an explanatory diagram showing the overall configuration of an image forming apparatus according to a first embodiment.

FIG. 1 is an explanatory diagram showing the overall configuration of an image forming apparatus according to a first embodiment.
An image forming apparatus 10 illustrated in FIG. 1 is an MFP (Multifunction Printer), and includes a plurality of kinds of modes related to job processing.

A job processing mode is a mode that can realize general functions such as copying, faxing, and scanning functions. When the image forming apparatus 10 is in a copy mode, a copy job can be executed. When the image forming apparatus 10 is in a fax mode, a fax job can be executed, and when the image forming apparatus 10 is in a scan mode, a scan job can be executed.

The copy job will be briefly described below.
First, a document is set on a document reader 130, and a copy operation is performed by means of an operator 160. A user can confirm, on a display 150, the set document size, paper size, and copy settings (e.g., settings for single-sided printing, double-sided printing, and aggregate printing).

When the user performs the operation of start through the operator 160, copy processing is executed. Specifically, the document reader 130 reads the document set by the user. A controller 100, which will be described later, generates image data from the document read by the document reader 130.

An image former 140 generates an image based on the image data on a sheet of paper conveyed from a paper tray 1410, and outputs the paper with the image formed thereon to a paper discharge tray 1420. In the present embodiment, the paper refers to a recording sheet or recording paper on which images are formed. The paper includes not only plain paper, but also various paper media, such as thick paper and glossy paper, and a film or the like that allows an image to be formed thereon.

Next, the fax job will be briefly described below.
When fax transmission is to be performed, a document is set on the document reader 130, and a fax transmission operation is performed by means of the operator 160. The user can confirm the set document size and transmission settings (transmission destination fax number, etc.) on the display 150.

When the user performs the operation of fax start through the operator 160, fax processing is executed. The controller 100, which will be described later, performs procedures for communication with a communication counterpart by a communicator 170 to be described later. Further, when a transmission-enabled state is ensured, the controller 100 performs necessary processing, such as changing the compression format of a compressed file to be transmitted to the communication counterpart, and then performs the processing of sequentially transmitting the compressed file to the communication counterpart via a communication line.

Also, when a fax is to be received, the controller 100 to be described later receives the compressed file transmitted from the communication counterpart while performing the procedures for communication by the communicator 170 to be described later, and applies decompression processing to the received compressed file by a compression/decompression processor not illustrated. Then, various kinds of image processing are applied to image data, and the image data is output to the image former 140. The image former 140 forms, on the basis of the output image data, an output image on recording paper.

In addition to the fax mode, it is also possible to transmit, as the function of transmitting document image data which has been read, the document image data by e-mail to an address stored in a storage 120 to be described later.

Next, the scan job will be briefly described below.
First, a document is set on the document reader 130, and a scan operation is performed by means of the operator 160. The user can confirm the set document size and output image settings (image file type, etc.) on the display 150.

When the user performs the operation of scan start through the operator 160, scan processing is executed. Specifically, the document reader 130 reads the document set by the user. The controller 100 to be described later generates image data from the document read by the document reader 130.

The image forming apparatus 10 executes various jobs while combining the above-described functions (i.e., the copying function, the faxing function, and the scanning function). Here, each time the user performs an operation input of the setting for a plurality of setting items of each job, due to an auto-complete function, setting values previously set by operation are automatically extracted from the job operation history and are displayed as the setting history.

As regards the job processing mode of the image forming apparatus, when the user operates the operator 160 to activate the job processing mode, the controller 100 of the image forming apparatus 10 causes an initial screen of the job processing mode that has been activated on a screen of the display 150 to be displayed. At this time, initial setting values of the setting items are displayed, and the setting items are configured to be changeable through the operator 160.

1.2 Functional Configuration

1.2.1 Image Forming Apparatus

Figure 2:
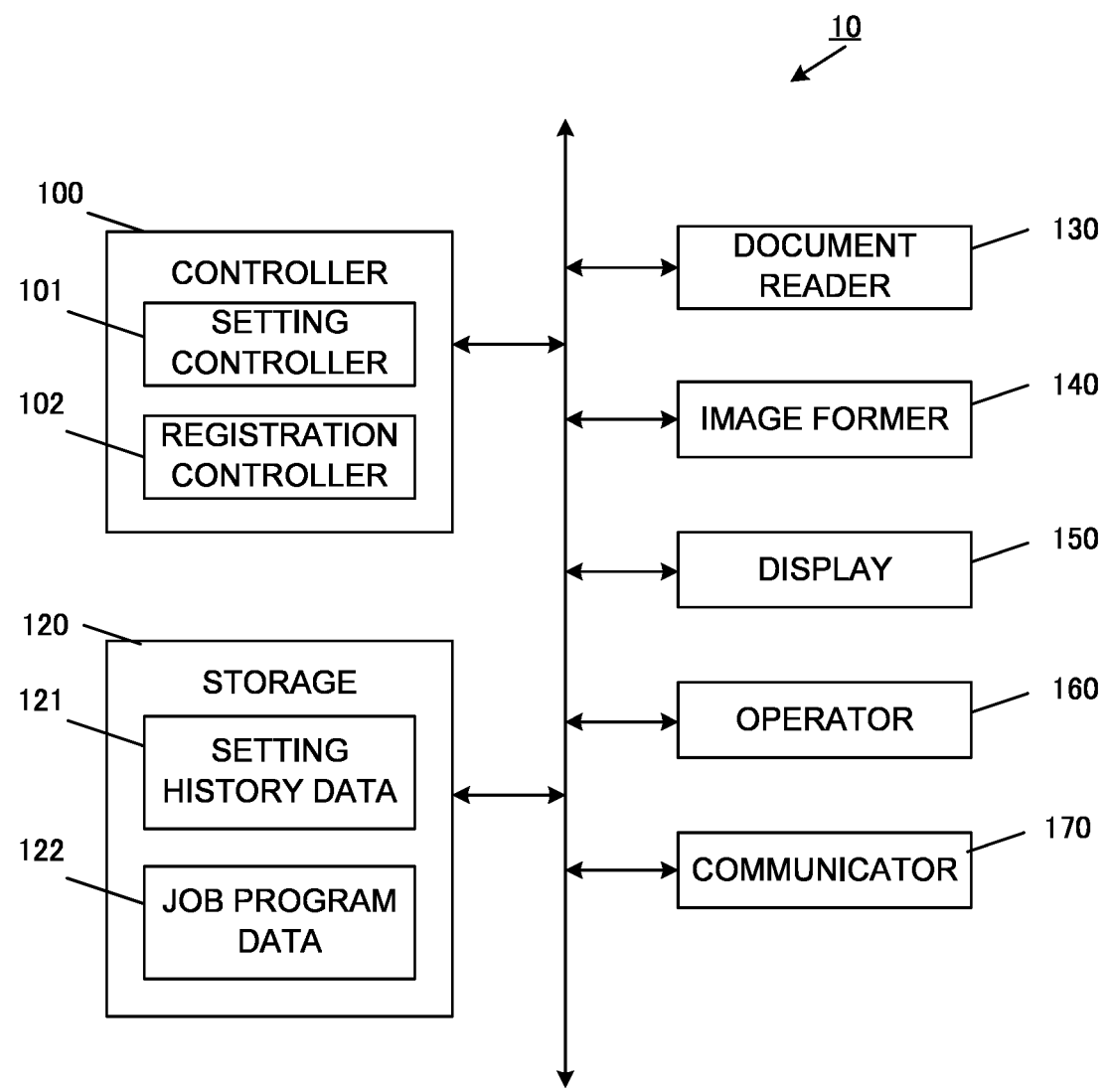
FIG. 2 is a block diagram showing a functional configuration of the image forming apparatus according to the first embodiment.

A functional configuration of the image forming apparatus 10 will be described with reference to FIG. 2. FIG. 2 is a block diagram showing the functional configuration of the image forming apparatus according to the first embodiment.

The controller 100 is a functional part for controlling the image forming apparatus 10 as a whole. The controller 100 implements various functions by reading and executing a control program stored in the storage 120, and is composed of one or more arithmetic devices (for example, a central processing unit [CPU]), and the like. The functions implemented by the controller 100 will be described below.

The controller 100 includes a setting processing function of performing setting processing, an image forming processing function of performing image forming processing, and the like. The controller 100 executes the copying function, the faxing function, the scanning function, and the like, as the image forming processing function.

The controller 100 is provided with a setting controller 101, and a registration controller 102.

The setting controller 101 controls processing related to job setting.

The registration controller 102 controls processing of making registration in a job program.

The storage 120 is a functional part where a program and data are stored. The storage 120 is constituted of, for example, a semiconductor memory such as a solid state drive (SSD), or a hard disk drive (HDD).

The storage 120 stores setting history data 121 and job program data 122.

The document reader 130 reads an image of a document, and is composed of, for example, a scanner device including a device that converts optical information into electrical signals, such as a contact image sensor (CIS) or a charge-coupled device (CCD).

For example, the document reader 130 reads the document placed on a placement table within a range set by the document size. Note that the document may be set on the placement table or may be set on an automatic document feeding device (ADF: Auto Document Feeder).

The image former 140 is a functional part for forming image data on a recording medium (for example, a recording sheet). For example, a recording sheet is fed from the paper tray 1410 shown in FIG. 1, and after an image has been formed on the surface of the recording sheet at the image former 140, the recording sheet is discharged from the paper discharge tray 1420. The image former 140 is composed of, for example, a laser printer or the like using an electrophotographic method.

Also, one or more paper trays 1410 are usually provided to store sheets of paper therein.

The display 150 displays various states of the image forming apparatus 10, and also displays the state of operation input. For example, the display 150 is composed of a liquid crystal display (LCD), an organic EL panel, or an electronic paper using an electrophoretic method.

The operator 160 is a button, a switch, or the like that receives an operation input from the user. The operator 160 may be realized by a hardware input device such as a switch or a keyboard. Alternatively, the operator 160 may be realized by a touch panel or the like that is integrally formed with the display 150. In this case, a method of detecting an input on the touch panel may be a general detection method, such as a resistive method, an infrared method, an electromagnetic induction method, and an electrostatic capacitive method.

The operator 160 of the present embodiment is provided with a hardware input device and a touch panel of the display 150, and the respective elements can be operated individually.

The communicator 170 is a functional part which performs communication with other devices. For example, it suffices that the communicator 170 includes an interface connectable to a network, and can communicate with another device via a wired/wireless local area network (LAN). Image data may be sent to or received from another device (for example, a universal serial bus [USB] memory stick) via a USB interface or the like. Also, the communicator 170 can be connected to a communication network such as a public network, a local area network (LAN), or the Internet, and a compressed file can be transmitted externally via the communication network by a communication method using facsimile or e-mail, for example.

The image forming apparatus 10 may further be provided with a necessary function in addition to the above-described structures. For example, the image forming apparatus 10 may be provided with such a management portion as a billing management portion which allows the image forming apparatus 10 to be used only when a fee is paid by the user.

1.3 Flow of Processing

Figure 3:
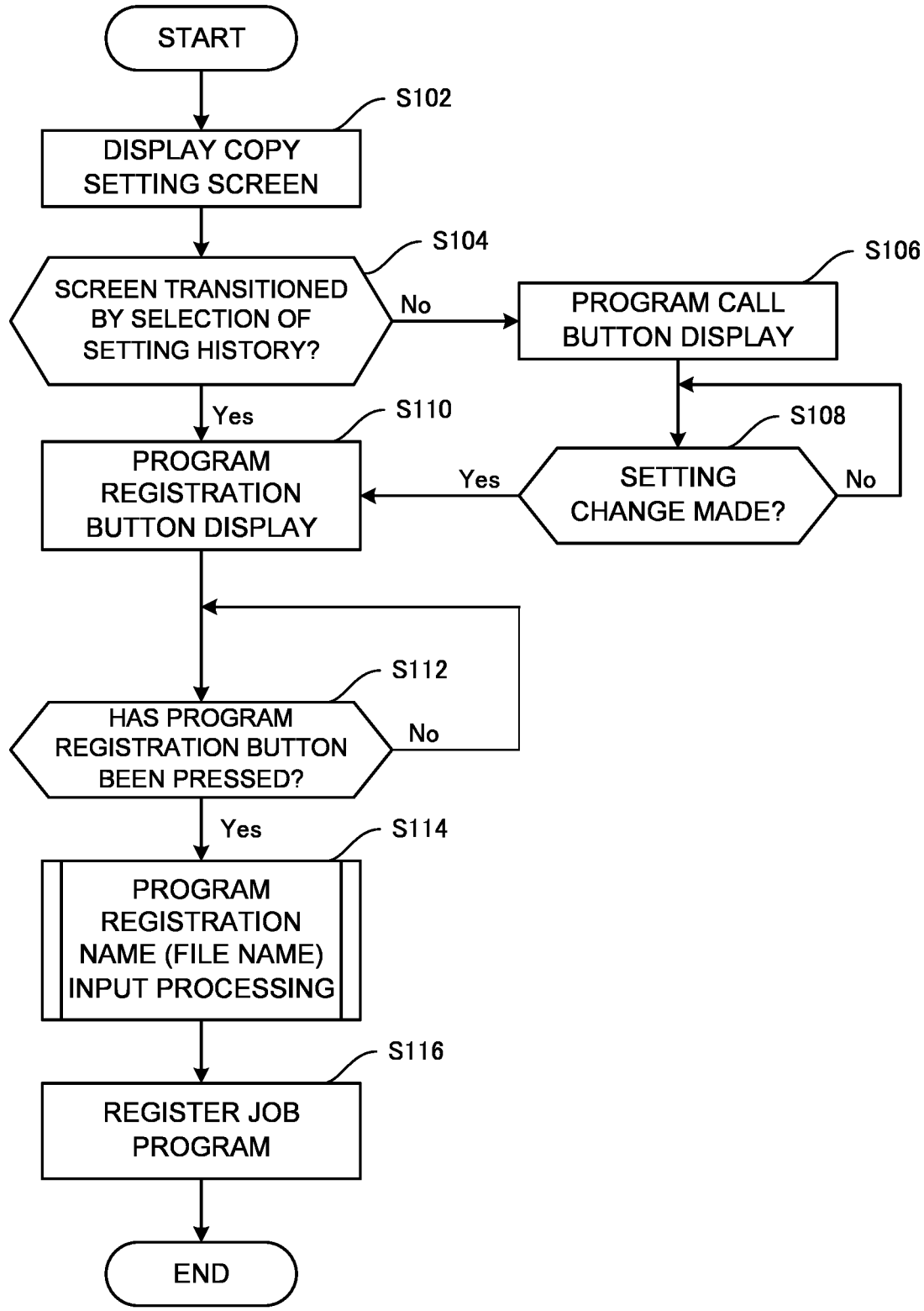
FIG. 3 is a flowchart illustrating job program registration processing of the image forming apparatus according to the first embodiment.

The setting processing of the image forming apparatus will be described with reference to FIG. 3. FIG. 3 is a flowchart illustrating job program registration processing of the image forming apparatus according to the first embodiment.

In each of the following embodiments, an example regarding registration of a job program in the copy mode will be described. However, the example is not limited to the above, and can be applied to the case of the other modes.

The image forming apparatus 10 displays a copy setting screen on the display 150 (step S102). The setting controller 101 in the controller 100 of the image forming apparatus 10 confirms whether the screen has transitioned to the copy setting screen as a result of selection of a setting history (step S104).

If the screen has not transitioned to the copy setting screen as a result of selection of the setting history (step S104: NO), the setting controller 101 displays a program call button on the display 150 (step S106). The setting controller 101 checks whether the user has made any change to the setting items of the copy setting screen (step S108). If a setting change has been made, the setting controller 101 displays a program registration button (step S110).

If the screen has transitioned to the copy setting screen as a result of selection of the setting history (step S104: YES), the setting controller 101 displays the program registration button (step S110).

The registration controller 102 in the controller 100 of the image forming apparatus 10 confirms whether the user has pressed the program registration button (step S112). If the user has pressed the program registration button, the registration controller 102 performs registration name input processing for the program (step S114). In other words, the processing of entering the file name of a job program is performed. Further, the registration controller 102 performs registration processing for the job program (step S116).

Figure 4:
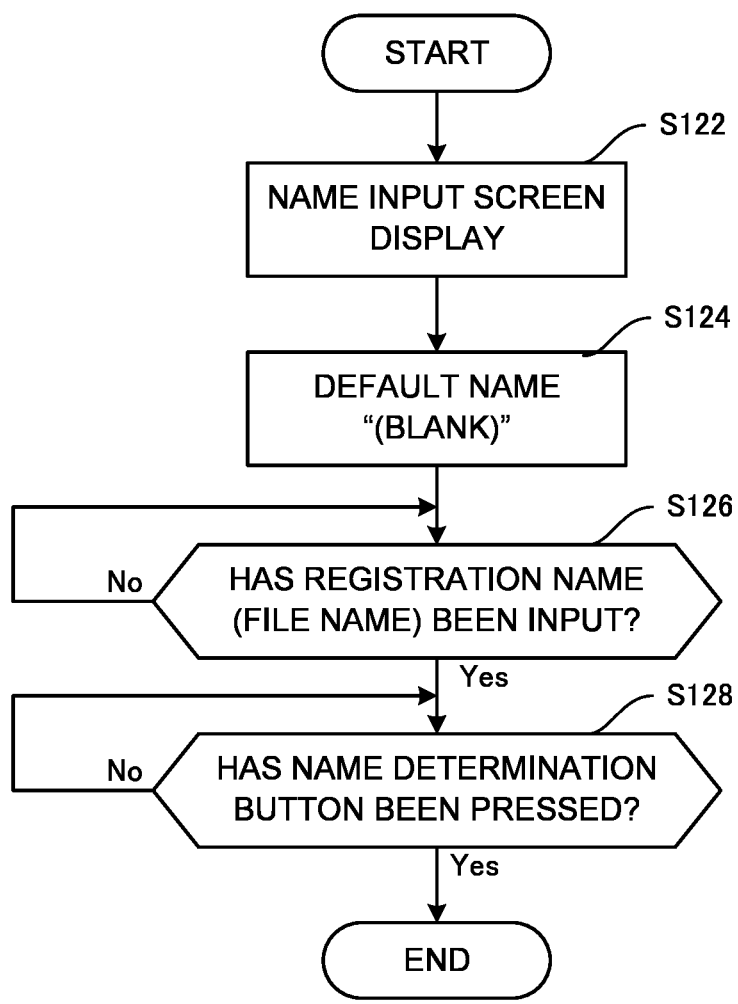
FIG. 4 is a flowchart illustrating registration name input processing for a job program of the image forming apparatus according to the first embodiment.

Next, the registration name input processing for a job program of step S114 will be described. FIG. 4 is a flowchart illustrating the registration name input processing for a job program of the image forming apparatus according to the first embodiment.

The registration controller 102 in the controller 100 of the image forming apparatus 10 displays a name input screen for job program registration (step S122). A blank is displayed in an input item for a name by default (step S124). The user enters a registration name (a file name), and when the registration controller 102 confirms the entry (step S126), the processing proceeds to step S128. The user presses a name determination button, and when the registration controller 102 confirms the pressing (step S128), the processing is ended.

1.4 Operation Examples

A specific example of the setting processing of the first embodiment will be described on the basis of operation screens of FIGS. 5 to 10.

Figure 5:
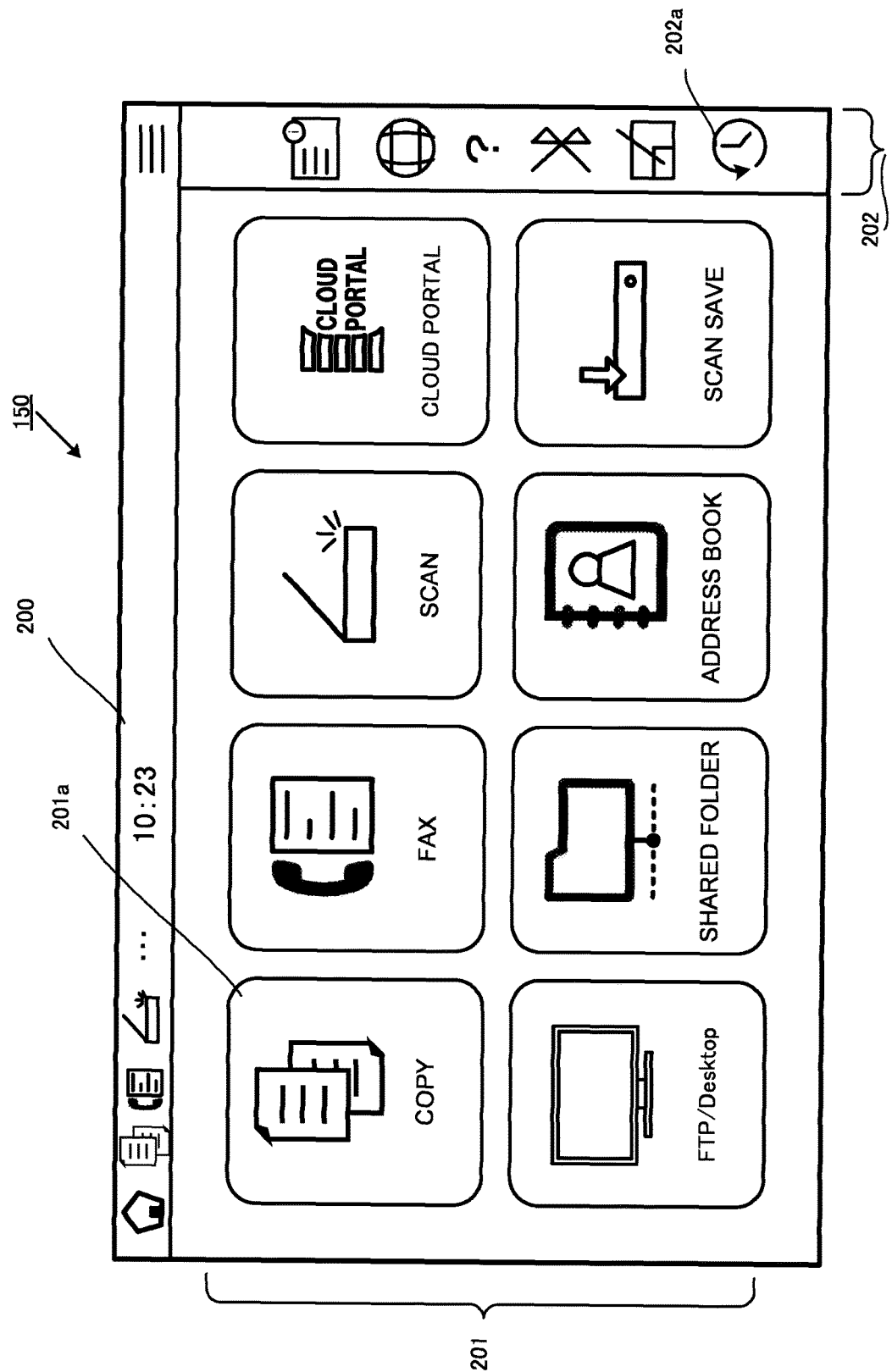
FIG. 5 is an explanatory diagram illustrating a home screen displayed on a display of the image forming apparatus according to the first embodiment.
Figure 6:
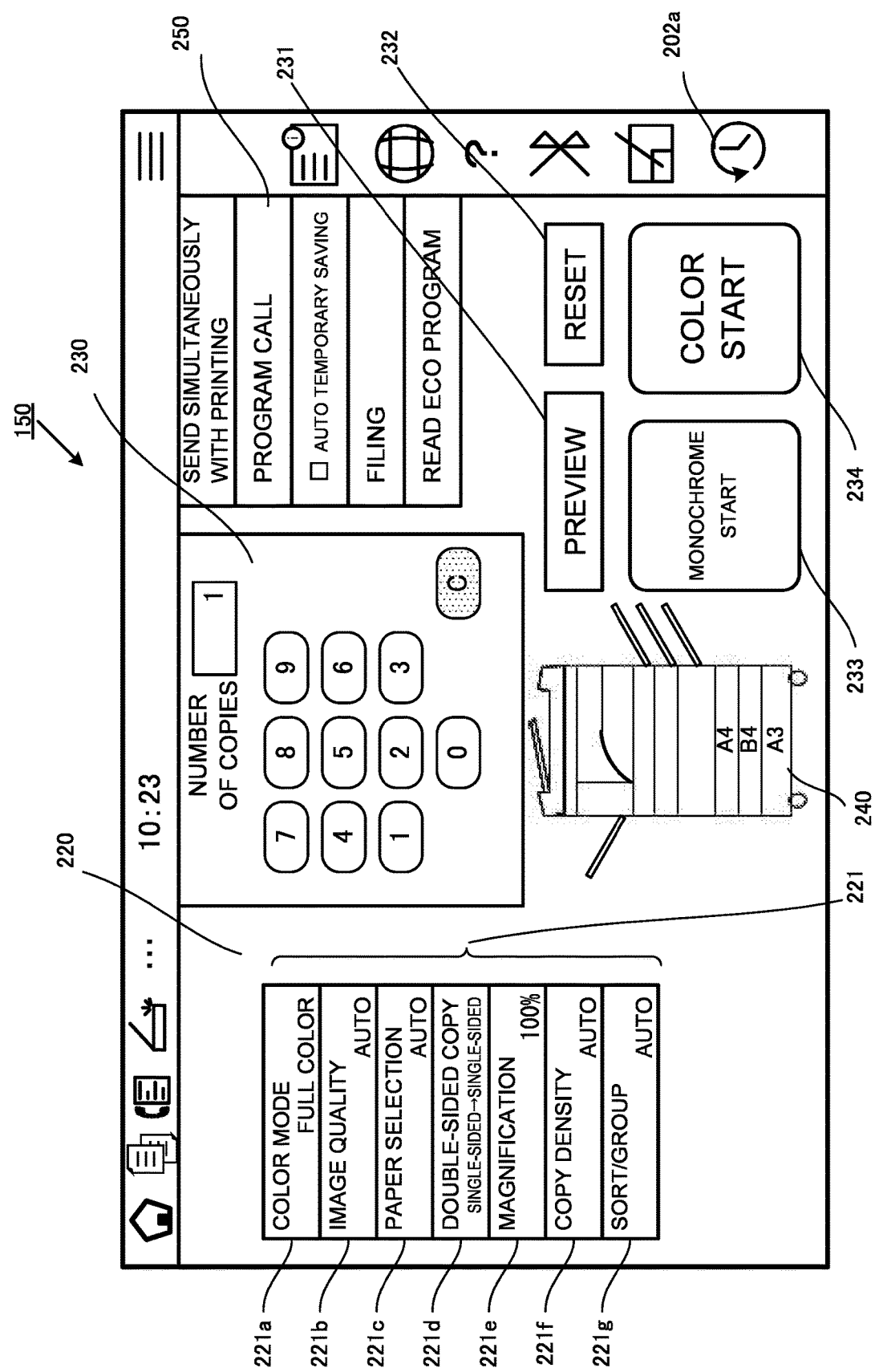
FIG. 6 is an explanatory diagram illustrating a default setting screen displayed on the display of the image forming apparatus according to the first embodiment.

As illustrated in FIG. 5, a plurality of mode icons 201 are displayed on a home screen 200 displayed on the display 150, and operation icons 202 are displayed on the right side of the screen. When the user presses a copy mode icon 201a, the screen transitions to a copy setting screen 220 as shown in FIG. 6.

On the copy setting screen 220, various setting items 221 (color mode 221a, image quality 221b, paper selection 221c, double-sided copy 221d, magnification 221e, copy density 221f, sort/group 221g), a number-of-copies input display 230, a paper layout diagram 240 of the image forming apparatus, a preview button 231, a reset button 232, a monochrome start button 233, and a color start button 234 are displayed.

Default setting contents are to be displayed in the various setting items 221. In addition, "1" is displayed as the number of copies of the number-of-copies input display 230.

On the upper right side of the screen, a "Program Call" button 250 is displayed, and a job program can be called by pressing the button 250.

Figure 7:
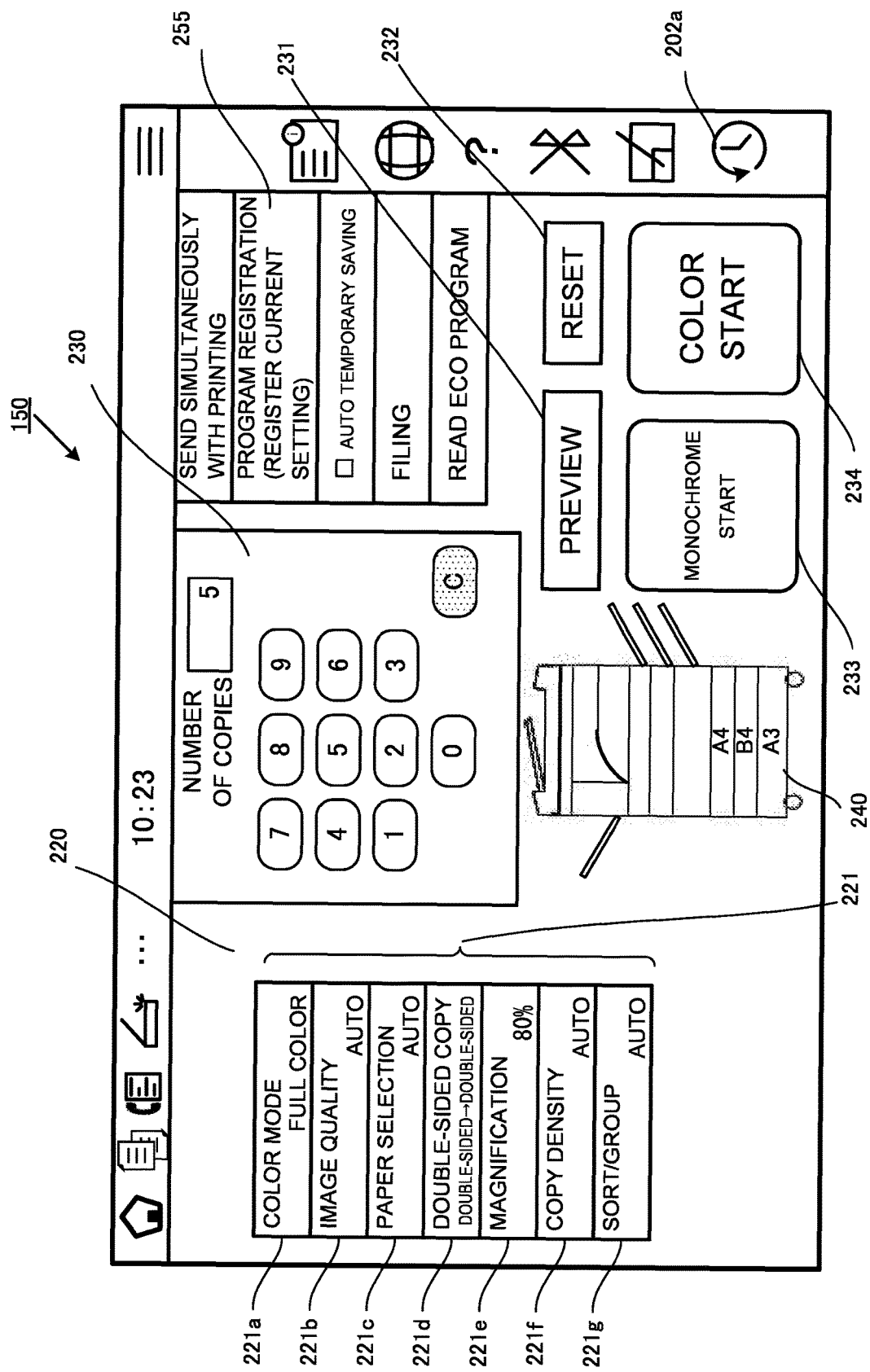
FIG. 7 is an explanatory diagram illustrating a setting change of a setting screen displayed on the display of the image forming apparatus according to the first embodiment.

As shown in FIG. 7, as inputs are made to the various setting items 221 and the number-of-copies input display 230, whereby the settings are changed from the default, the "Program Call" button 250 is changed to a "Program Registration" button 255. By this change, the user is informed that the changed settings can be registered in a program.

Figure 8:
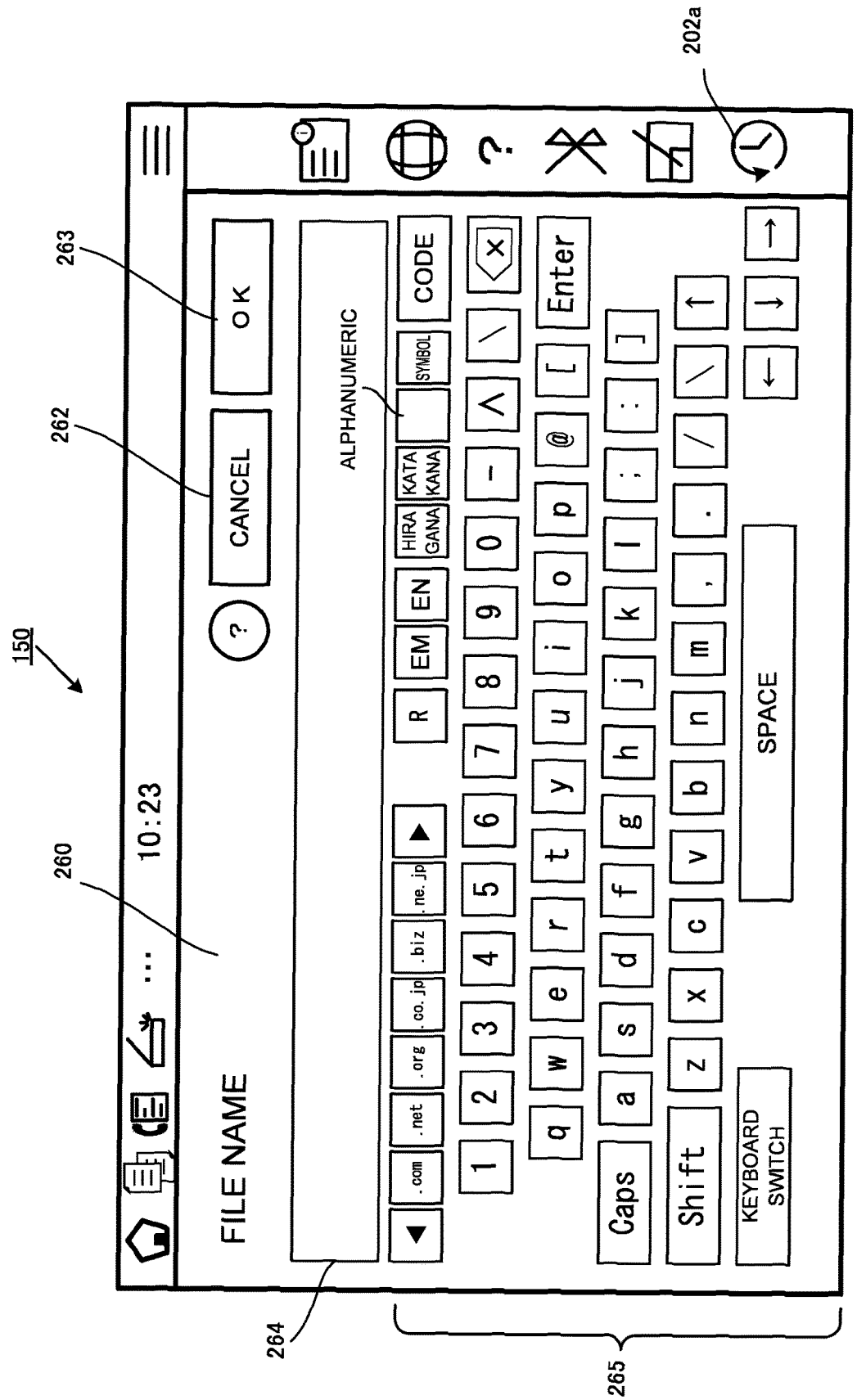
FIG. 8 is an explanatory diagram illustrating a name input screen displayed on the display of the image forming apparatus according to the first embodiment.

When the "Program Registration" button 255 is pressed, the screen transitions to a file name input screen 260 as shown in FIG. 8. The file name input screen 260 includes a "Cancel" button 262, an "OK" button 263, an input display field 264 for the file name, and a software keyboard 265.

The user can enter a file name in making program registration by pressing the desired key on the keyboard 265 being displayed. When the input is completed and the "OK" button is pressed, the file name of the job program is determined, and the program registration is executed.

In the above, explanation has been given for the registration processing, which is to be performed when registration of a job program is performed by changing the settings from the default on the copy setting screen 220 and the screen transitions to the file name input screen 260. However, there is a method of registering a job program different from the above.

Figure 9:
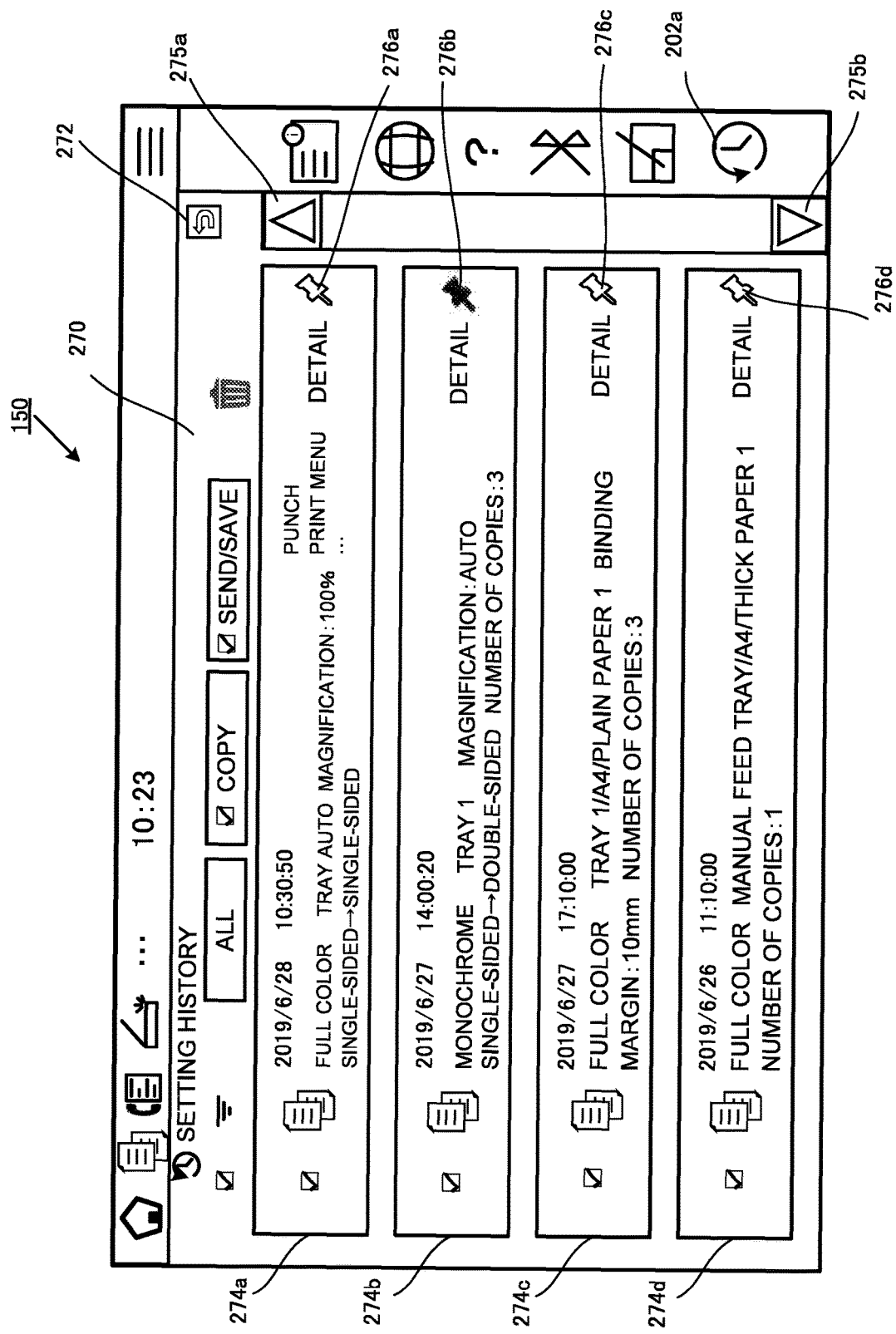
FIG. 9 is an explanatory diagram illustrating a setting history screen displayed on the display of the image forming apparatus according to the first embodiment.

Such a method corresponds to a case where the screen transitions to a setting history screen 270 as shown in FIG. 9 by pressing of a setting history icon 202a on the home screen 200 of FIG. 5.

The setting history screen 270 includes a "Back" button 272, setting histories 274a to 274d, and up and down scroll buttons 275a and 275b for the setting history. In the respective setting histories 274, pinning icons 276a to 276d indicating selection thereof are displayed. If the pinning icon 276 is white, it indicates that the setting history in question is not selected, whereas if the pinning icon 276 is black, it indicates that the setting history in question is selected. The pinning icons 276a, 276c, and 276d are white, which means that pinning is not made, and the pinning icon 276b is black, which means that pinning is made.

Although the setting histories are erased if the number of setting histories exceeds a certain level, they can be kept by the pinning. In this way, the pinned setting histories that have been set can be kept remaining and be available for use. However, if the pinned setting history is to be used frequently, it may be better to register that setting history as a job program.

Figure 10:
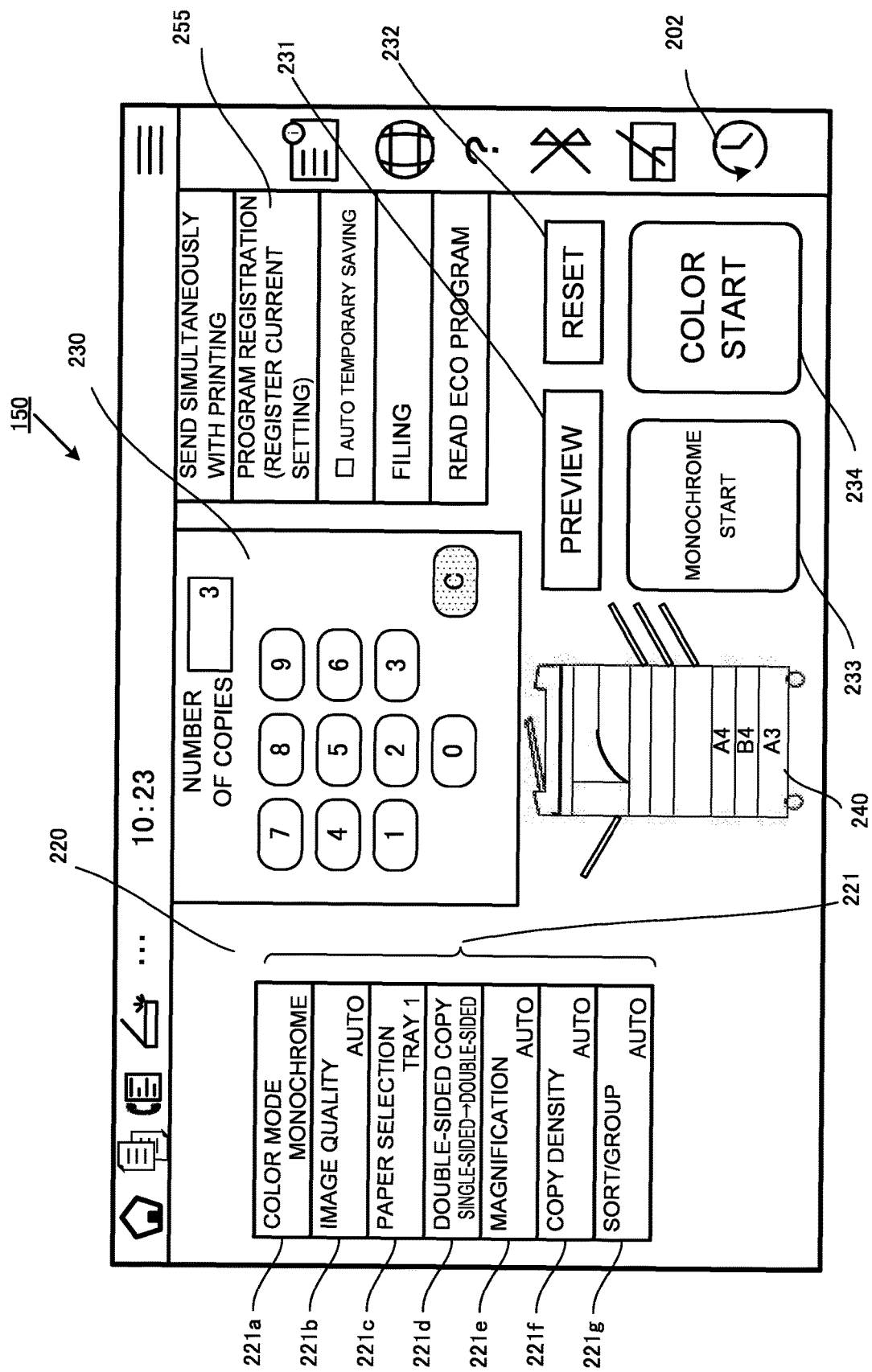
FIG. 10 is an explanatory diagram illustrating a setting screen after transition from the setting history screen displayed on the display of the image forming apparatus according to the first embodiment.

Therefore, the setting history 274b with the display of the icon 276b indicating the pinning is selected by an operation such as a double-tap or a long press. This operation may be set arbitrarily. Then, the copy setting screen 220 reflecting the setting contents of the setting history 274b as shown in FIG. 10 is displayed. In this case, the "Program Registration" button 255 is displayed, and the user is informed that registration to the job program is enabled. The "Program Registration" button 255 may be colored or may be made to blink, for example, so that it is displayed to be noticeable to the user. When the "Program Registration" button 255 is pressed, the file name input screen 260 of FIG. 8 is displayed, and the user enters the file name.

The pinning of the setting history 274b which has been registered in the job program is cancelled, and the pinning icon 276b becomes white.

The selection of the setting history for which the job program registration is to be made is not limited to the pinned setting histories, but unpinned setting histories may also be allowed to be selected. In addition, it is possible to have the setting history without a pinning function selected and registered in the job program.

The registered setting history may be processed as described below.

The registered setting history may be left as a setting history as it is, or may be left in such a state that the order of priority for display is lowered. Also, the registered setting history may be deleted. As described above, the user may be allowed to choose whether to keep the registered setting as the setting history or delete such a setting history.

It is also possible to tentatively leave the setting history as it is, and control the display thereof according to the user's tendency (such as which of the setting history and the job program is used more frequently). For example, which of the setting history and the job program is used more frequently is determined over a certain period of time. If the frequency of use of the setting history is low, the setting history is deleted, whereas if the frequency of use of the setting history is as high as a certain level, the setting history is left as it is.

In addition, the embodiment may be configured such that a folder/tab having the name "Job Program Registered", for example, is automatically generated on the setting history screen, and the folder/tab allows the setting histories registered in the job program to be displayed collectively.

1.5 Advantageous Effects

Thus, when the screen transitions from the setting history screen to the setting screen, the "Program Registration" button is displayed on the setting screen reflecting the setting contents of the setting history. Therefore, not only can the user be informed that program registration is enabled, but it is also possible to immediately proceed to the registration processing. Meanwhile, when the screen transitions from a screen other than the setting history screen to the setting screen, the "Program Registration" button is not displayed until the settings are changed from the default. Therefore, the user is not informed that program registration is enabled until the "Program Registration" button is displayed, and it is not possible to proceed to the registration processing.

2. Second Embodiment

An image forming apparatus according to a second embodiment is an apparatus which adopts, when the setting contents of the setting history are to be registered as a job program, a registration name indicating that the registration is made from the setting history.

A configuration of the image forming apparatus is the same as that of the first embodiment, and thus description thereof is omitted.

2.1 Flow of Processing

Job program registration processing of the second embodiment is the same as the processing of the first embodiment shown in FIG. 3, and thus description thereof is omitted.

Figure 11:
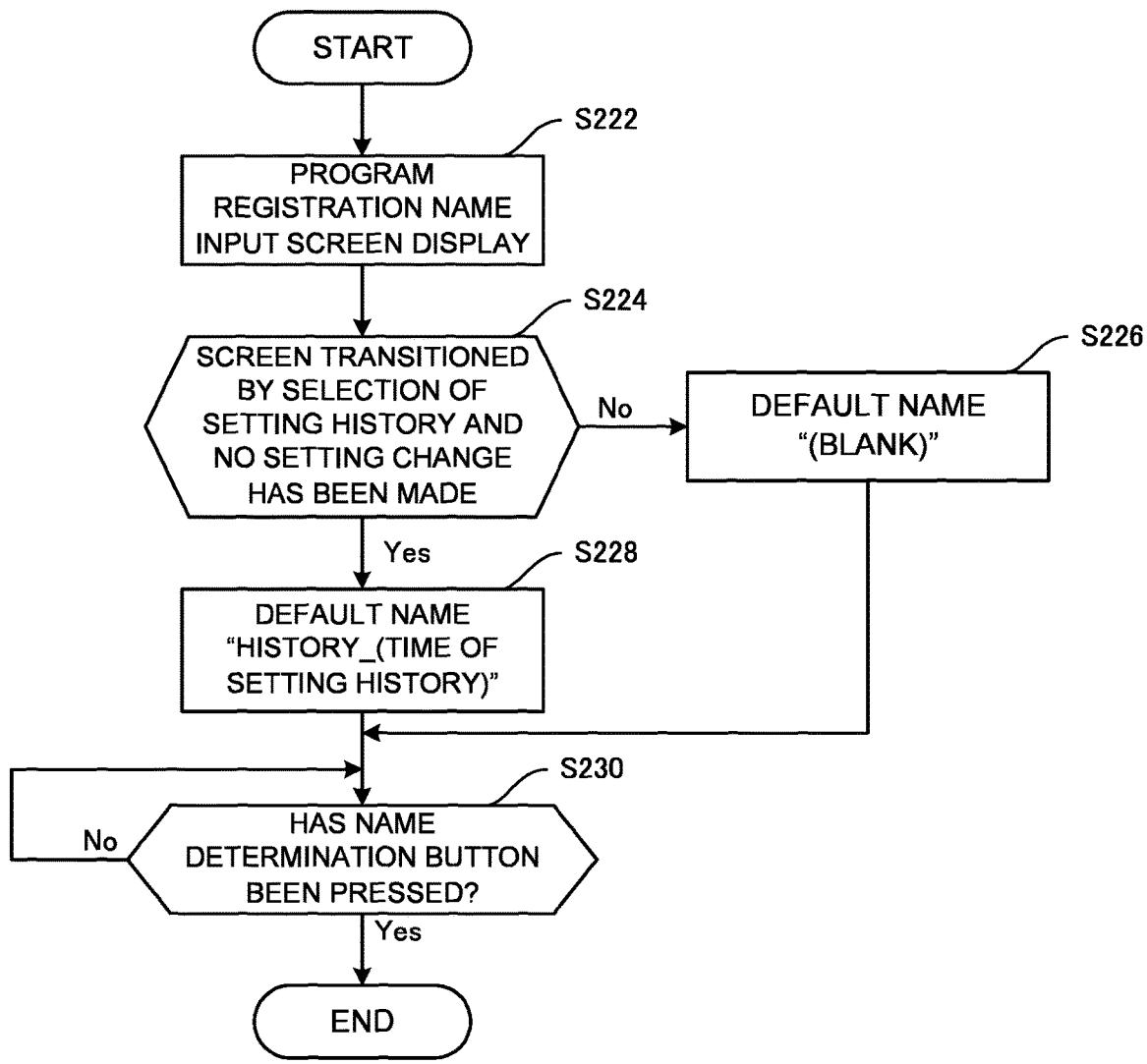
FIG. 11 is a flowchart illustrating registration name input processing for a job program of an image forming apparatus according to a second embodiment.

FIG. 11 is a flowchart illustrating registration name input processing for a job program of the image forming apparatus according to the second embodiment.

A registration controller 102 in a controller 100 of an image forming apparatus 10 displays a name input screen for job program registration (step S222). The registration controller 102 confirms that the screen has transitioned to the setting screen by selection of a setting history, and that no setting change has been made (step S224). If this condition is not satisfied (step S224: NO), a blank is displayed as a default name (step S226). If this condition is satisfied (step S224: YES), as a default name, a name indicating that the program is of setting contents of the setting history is displayed (step S228). For example, "History_(set time of the setting history)" is applied as the name.

The registration controller 102 confirms whether a name determination button has been pressed (step S230), and if the button has been pressed, the processing is ended.

2.2 Operation Example

Figure 12:
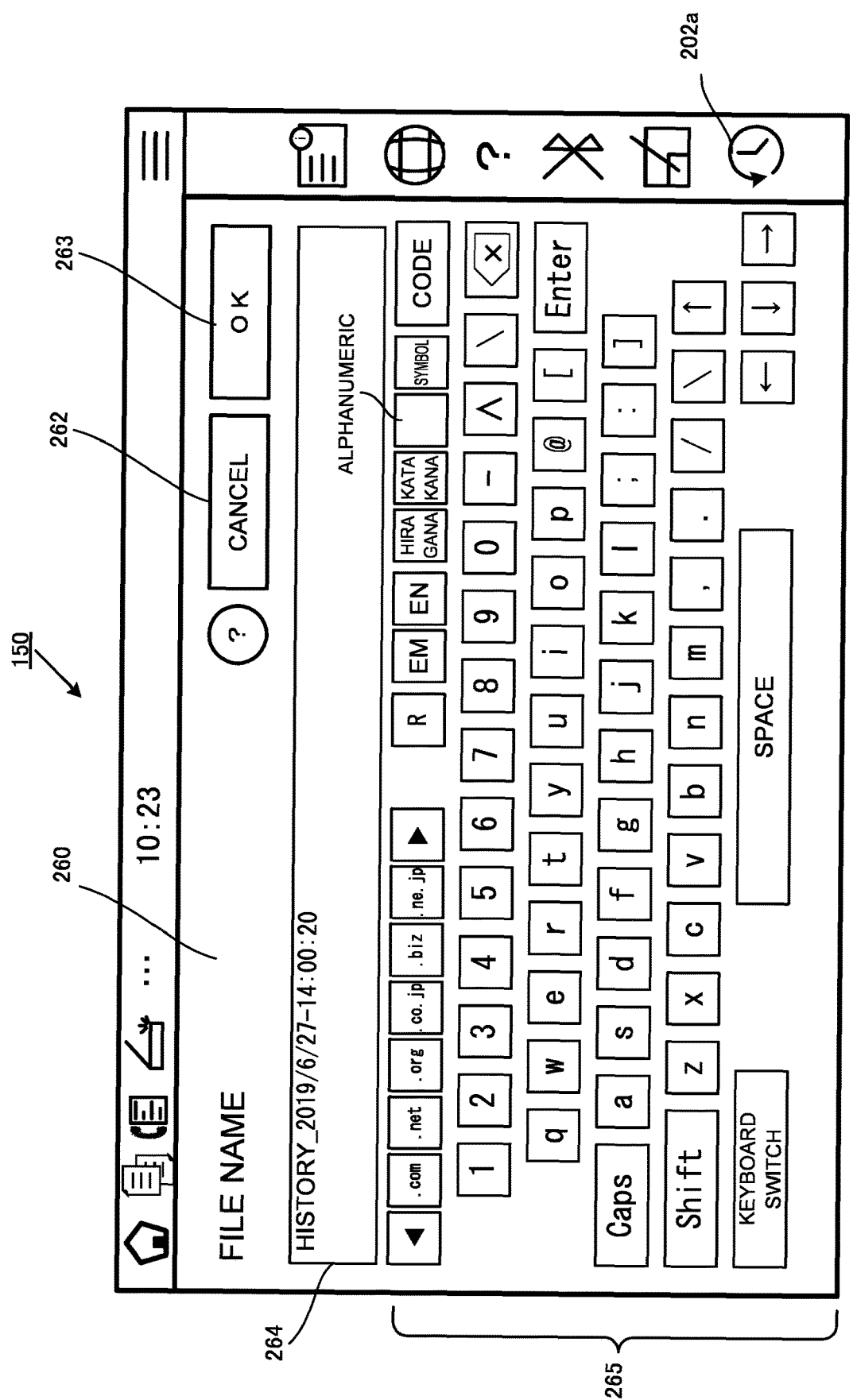
FIG. 12 is an explanatory diagram illustrating a name input screen displayed on a display of the image forming apparatus according to the second embodiment.

A specific example of name input processing of the second embodiment will be described on the basis of a name input screen of FIG. 12. It is assumed that in the image forming apparatus 10, the screen has transitioned to the copy setting screen 220 of FIG. 10 by selection of the setting history 274b displayed on the setting history screen 270 shown in FIG. 9, as in the first embodiment, on a display 150. When the "Program Registration" button 255 of FIG. 10 is pressed, the registration controller 102 causes the screen of the display 150 to transition to a registration name input screen shown in FIG. 12. At this time, an input display field 264 is displayed as "History_2019/6/27-14:00:20".

When the screen transitions to the copy setting screen 220 by selection of a setting history, the registration controller 102 displays in the input display field 264 a name by which the specific setting history of the setting contents can be identified. Here, the characters "History" representing a setting history, and "execution time of the job of the history" for identifying the setting history are used as a default name. The user can use a software keyboard 265 to modify the default name.

2.3 Advantageous Effects

In this way, when the screen transitions to the setting screen by selection of a setting history on the setting history screen, a name by which the setting history can be identified can be preset as the registration name for a job program. Therefore, the user need not to input the name each time, and the number of operation steps can be reduced. In addition, since the name is based on a certain rule, it becomes easy to identify the cited setting history.

3. Third Embodiment

An image forming apparatus according to a third embodiment is an apparatus which displays, when a setting history displayed on a setting history screen is that registered in a job program, a file name of the job program for the setting history registered in the job program, for the purpose of indicating a linkage between the setting history and the job program. A configuration of the image forming apparatus is the same as that of the first embodiment, and thus description thereof is omitted.

3.1 Flow of Processing

Figure 13:
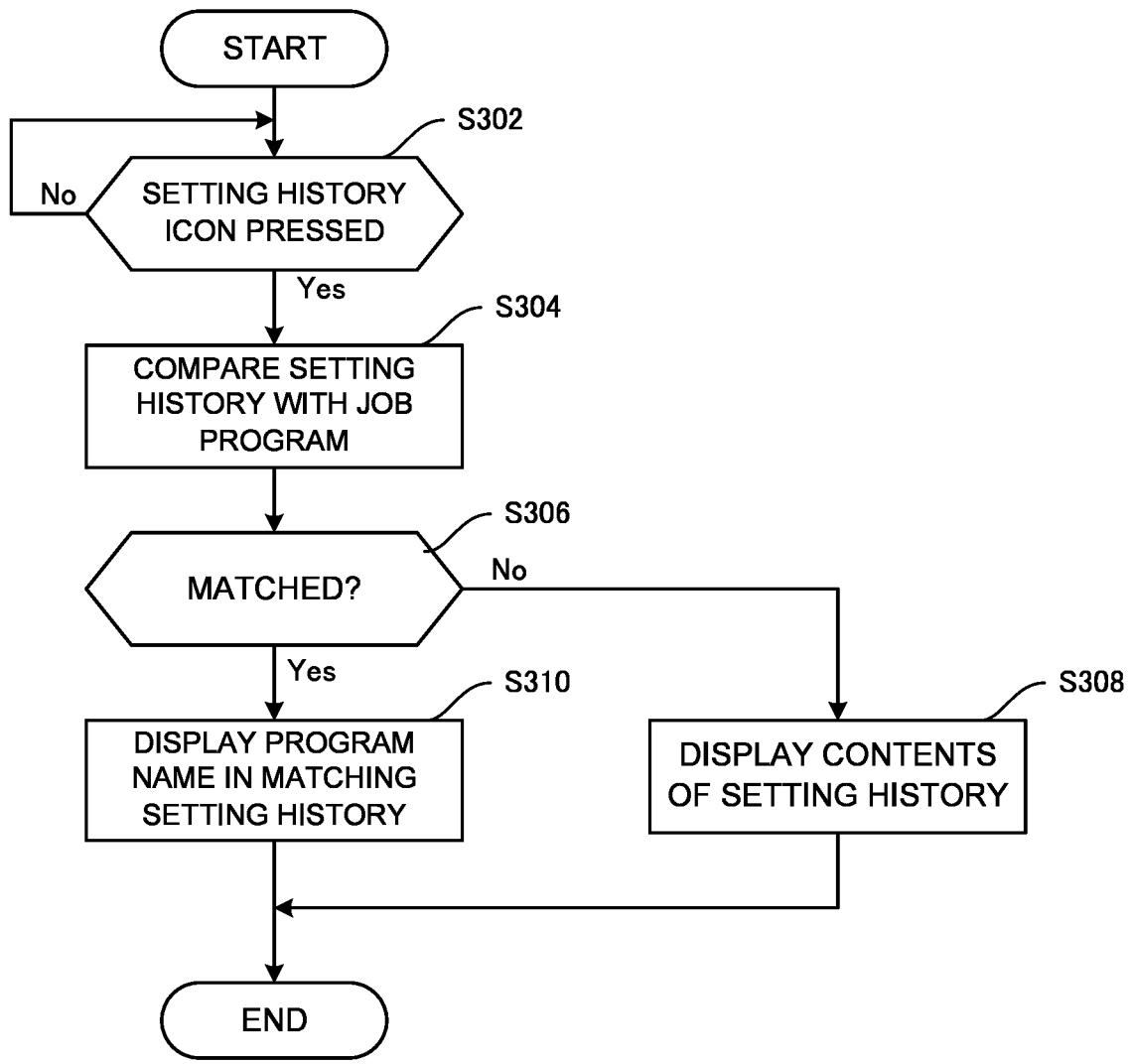
FIG. 13 is a flowchart illustrating processing of displaying a program name in a setting history of an image forming apparatus according to a third embodiment.

A display of a registration name of a job program in a setting history will be described with reference to FIG. 13. FIG. 13 is a flowchart illustrating processing of displaying a file name of a job program in a setting history of the image forming apparatus according to the third embodiment.

A setting controller 101 in a controller 100 of an image forming apparatus 10 confirms whether the setting history icon 202a of the home screen 200 shown in FIG. 5 has been pressed (step S302). If pressed, the processing proceeds to step S304, and setting histories stored in a storage 120 are compared with setting contents of job programs (step S304). Then, it is confirmed whether there is a job program whose content matches with the setting contents of the setting history (step S306). If there is a job program whose content matches with the setting contents of the setting history, the registration name of the job program (i.e., a file name of the job program) is displayed in a display portion of the setting history of the setting history screen (step S310). In this way, the user is informed that there is a job program having the same content.

If there is no job program whose content matches with the setting contents of the setting history, the contents of the setting histories are displayed as they are (step S308).

3.2 Operation Example

A specific example of processing of displaying a registration name of a job program in a setting history of the third embodiment will be described with reference to the setting history screen of FIG. 14.

In the image forming apparatus 10, it is assumed that the setting history icon 202a of the home screen 200 shown in FIG. 5 is pressed, and the screen has transitioned to a setting history screen 270 of FIG. 14, on a display 150. The screen transitions to the setting history screen of FIG. 9 in the case of the first embodiment, but what is different in the third embodiment of FIG. 14 from FIG. 9 is the display content of a setting history 274b. In the setting history 274b of FIG. 14, a job program registration name (i.e., a file name of the job program), which is "Job Program 'For Approval Document Copy'" is displayed, and the contents of the setting history are not displayed.

When the image forming apparatus 10 compares the setting contents of the setting history 274b of setting history data stored in the storage 120 with the respective setting contents of job program data, it is found that the setting contents of the setting history 274b match with the content of a job program having the name "For Approval Document Copy". Therefore, instead of displaying the setting contents of the setting history 274b, the registration name of the matching job program is displayed.

3.3 Advantageous Effects

As described above, instead of displaying the setting contents of the setting history, the registration name of the job program whose content matches with the setting contents is displayed. By this feature, it is possible to inform the user that there is a job program whose content matches with the setting contents, and prevent the user from performing a registration operation of a job program with the same setting contents.

4. Modification Example

The embodiments of the present invention have been described in detail with reference to the accompanying drawings, but the specific configuration is not limited to the configurations of the present embodiments, and designs or the like to the extent that they do not depart from the gist of the present invention are also included in the scope of the claims.

It is also possible to select a plurality of setting histories and register them as a job program. In this case, the selected setting histories can be registered as a single job program, or the selected setting histories can be registered as job programs individually.

Further, if the selected setting histories include settings that have an exclusive relationship (e.g., color and monochrome), basically, the selected setting histories are registered as job programs individually. However, if the user wishes to register the selected setting histories as a single job program, the user may be allowed to select which of the settings should be kept.

In addition, the program to be operated on each apparatus in the embodiment is a program which controls the CPU or the like (i.e., a program for causing a computer to function) so as to implement the functions of the above-described embodiments. Moreover, information handled by these apparatuses is temporarily stored in a temporary storage device (for example, a RAM) when being processed, and then stored in various storage devices such as a ROM and an HDD, where the information is read, corrected, and written by the CPU as needed.

Here, a recording medium for storing the program may be any as long as it is a non-transitory recording medium such as a semiconductor medium (for example, a ROM, a non-volatile memory card, and the like), an optical recording medium/magneto-optical recording medium (for example, a digital versatile disk (DVD), a magneto optical disk (MO), a Mini Disk (MD), a compact disk (CD), a Blu-ray (registered trademark) Disc (BD)), and the like), or a magnetic recording medium (for example, a magnetic tape, a flexible disk, and the like). Further, not only are the functions of the above-described embodiments implemented by executing the loaded program, but the functions of the present invention may also be implemented by processing performed in cooperation with an operating system or other application programs, etc., on the basis of the instructions of the program.

Furthermore, if the program is to be distributed to the market, the program may be stored in a portable recording medium for distribution, or transferred to a server computer connected via a network such as the Internet. In this case, a storage device of the server computer is also included in the present invention as a matter of course.

In addition, a part of or all of the apparatuses in the above-described embodiments may be realized as an LSI (Large Scale Integration), which is typically an integrated circuit. Respective functional blocks of the apparatuses may be individually formed as a chip, or may be partially or wholly integrated and formed as a chip. In addition, a method of achieving the integrated circuit is not limited to the LSI, but may be realized by a dedicated circuit or by general-purpose processor. In addition, when a technology for achieving the integrated circuit which substitutes for the LSI emerges as a result of the progress of the semiconductor technology, it is of course possible to use an integrated circuit based on such a technology.

What is claimed is:

1. An image forming apparatus which stores settings for use in performing job processing, the image forming apparatus comprising:
   a display;
   a storage which stores a setting history related to settings of past job processing, and a collective setting in which settings related to job processing are registered collectively;
   a setting controller which displays a setting history screen including the setting history on the display, displays on the display, in response to selection of the setting history, a setting screen reflecting setting contents based on the selected setting history, and displays a registration button to perform processing to register the collective setting on the setting screen; and
   a registration controller which performs the processing to register the collective setting in response to an operation on the registration button,
   wherein the setting controller:
   restricts displaying of the registration button when the setting screen is not displayed by a transition from the setting history screen, and
   the setting controller displays the registration button if the setting contents are changed on the setting screen.

2. The image forming apparatus according to claim 1, wherein the registration controller causes a registration name, which is a name registered in performing the processing to register the collective setting, to be a name indicating that the name is based on the setting history.

3. The image forming apparatus according to claim 2, wherein the registration name includes character information based on the setting history, and time when job processing associated with the setting history has been executed.

4. The image forming apparatus according to claim 1, wherein the setting controller compares setting contents of the setting history read from the storage with setting contents of the collective setting, and when the two compared setting contents match, a registration name of the collective setting is indicated in the setting history displayed on the setting history screen.

5. A method of controlling an image forming apparatus comprising: a display; and a storage which stores a setting history related to settings of past job processing, and a collective setting in which settings related to job processing are registered collectively, the method comprising:
- displaying a setting history screen including the setting history on the display,
- displaying on the display, in response to selection of the setting history, a setting screen reflecting setting contents based on the selected setting history,
- restricting a display of a registration button when the setting screen is not displayed by a transition from the setting history screen;
- displaying, on the setting screen, the registration button to perform processing to register the collective setting if the setting contents are changed on the setting screen; and
- registration controlling of performing the processing to register the collective setting in response to an operation on the registration buttons.

* * * * *